United States Patent [19]

Lafever et al.

[11] 4,025,819

[45] May 24, 1977

[54] MOTION DETECTING SIGNAL SOURCE

[75] Inventors: Edward E. Lafever, Hagerstown; Larry O. Gray, Greensfork, both of Ind.

[73] Assignee: Dana Corporation, Toledo, Ohio

[22] Filed: Nov. 19, 1975

[21] Appl. No.: 633,400

[52] U.S. Cl. .................................. 361/236; 331/65; 331/172
[51] Int. Cl.² .......................................... H02P 5/00
[58] Field of Search ................. 317/5, DIG. 2, 146; 331/65, 149, 172–174; 324/78 J, 168, 179, 180, 174

[56] References Cited
UNITED STATES PATENTS 3,688,290  8/1972  Beer ............................. 324/179 X

*Primary Examiner*—Harry Moose
*Attorney, Agent, or Firm*—William J. Clemens

[57] ABSTRACT

An apparatus for detecting relative movement between two objects which is illustrated in the preferred embodiment as a vehicle road speed signal source including a reed switch oscillator for generating an output signal having a frequency and a magnitude proportional to the road speed of an associated vehicle. Current flows through a biasing coil proximate the reed switch to generate a magnetic field which is slightly less than the field required to close the switch contacts. A permanent magnet means attached to the drive shaft of the vehicle generates a magnetic field which aids the biasing coil magnetic field to close the reed switch contacts. A transistor responds to the closing of the reed switch contacts to turn off the current to the biasing coil which allows the reed switch contacts to open. The transistor responds to turn on the biasing coil current and the cycle is repeated to generate a pulsed signal as long as the magnetic field from the permanent magnet means is present once each revolution of the drive shaft. The oscillator pulsed output signal is shaped into a triangular output signal having one peak for each revolution of the drive shaft.

9 Claims, 3 Drawing Figures

MOTION DETECTING SIGNAL SOURCE

BACKGROUND OF THE INVENTION

1. FIELD OF THE INVENTION

The present invention relates to an apparatus for generating an output signal having a frequency proportional to the road speed of a vehicle.

2. DESCRIPTION OF THE PRIOR ART

In recent years, the factors of safety, environmental concern and convenience have created a demand for vehicle speed control devices. For example, in an automobile, the driver's attention must be divided between watching the traffic and road and watching the speedometer so that he can maintain a chosen speed. In addition, on a long trip it becomes quite tiring to manually control the accelerator pedal since the driver's right foot and leg must remain in relatively the same position. When a speed control apparatus is utilized, the driver is free to be constantly alert to the traffic and road conditions and will arrive at his destination in a less tired condition. Furthermore, the maintenance of a constant speed tends to increase gas mileage and decrease automobile emissions which are important environmental goals.

Today, many trucks include power take-off units for driving auxiliary equipment. Often it is desirable to maintain a uniform operating speed under varying load conditions imposed on the truck engine by the auxiliary equipment. Normally, this requires an operator who must control the accelerator pedal in response to the engine speed as read from a tachometer. This is a tiring and a difficult job and often one or more other workers must be utilized to monitor and/or operate the auxiliary equipment. Therefore, a speed control apparatus may be utilized to advantage to control the engine at a uniform speed. Such operation tends to reduce fuel consumption and engine emissions and may allow a reduction in the number of workers required.

The speed control apparatus requires as an input a signal representing the actual speed to be controlled. In previous speed control systems, it has been common practice to derive the actual speed signal from the speedometer cable. This is not a difficult task when the vehicle is being constructed since the required connection to some form of actual speed signal generating means may be provided. However, it is much more difficult to add a speed control apparatus to an existing vehicle. The speedometer cable must be replaced by a speedometer cable modified to drive a speed signal source. This requires the production of a great many speedometer cables for use with the various models of cars on the road today. Such an approach, therefore, is costly from the standpoint of the large inventory required and the large amount of time required to replace the speedometer cables.

SUMMARY OF THE INVENTION

The present invention relates to a vehicle road speed signal source for generating an output signal having a frequency proportional to the vehicle road speed. A reed switch oscillator includes a transistor which is biased on having a normally open reed switch connected between the base and ground. A biasing coil is connected between a power supply and ground through the transistor and receives a current flow for generating a magnetic field slightly less than that required to close the reed switch. A permanent magnet means attached to the vehicle drive shaft generates a magnetic field which aids the biasing coil magnetic field to close the switch contacts when the permanent magnet means is rotated into proximity with the reed switch.

When the reed switch contacts close, the transistor base is grounded and the transistor turns off to stop the biasing coil current. The biasing coil magnetic field collapses and the reed switch contacts open if the permanent magnet means magnetic field is not strong enough to keep them closed. Now the transistor is turned on to supply current to the biasing coil and the cycle is repeated as long as the permanent magnet means are proximate the biasing coil.

The reed switch oscillator generates a high frequency pulse train which is integrated to a sawtooth waveform. The sawtooth output is compared with a reference voltage by a high gain operational amplifier functioning as a voltage comparator to generate a square wave having a frequency proportional to the speed of rotation of the drive shaft. The square wave is differentiated and applied to a transistor switch to turn it on and off. The transistor output is integrated to a sawtooth and applied to a second comparator to generate a square wave. The square wave is integrated by a capacitor to generate a triangular waveform having a frequency and average magnitude proportional to the vehicle road speed. The differentiation and subsequent integration of the square wave output from the first comparator generates a sawtooth wave having a magnitude inversely proportional to the vehicle road speed. The second comparator generates the square wave with a duty cycle proportional to the vehicle road speed such that the triangular output waveform also has a magnitude proportional to the vehicle road speed.

DESCRIPTION OF THE PREFERRED EMBODIMENT

Figure 1:
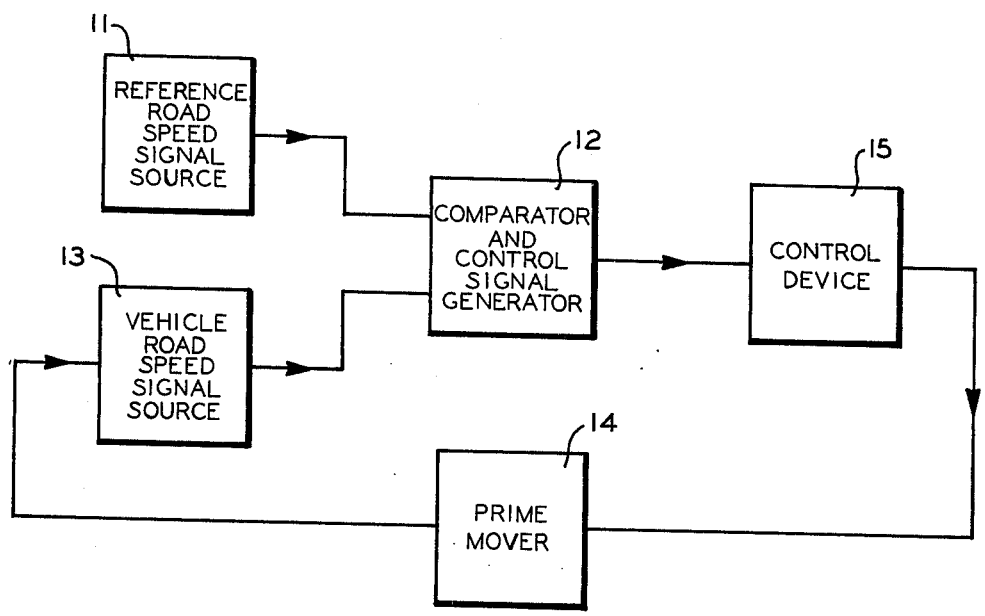
FIG. 1 is a block diagram of a speed control system utilizing the present invention.

Referring to FIG. 1, there is shown a block diagram of a vehicle speed control system utilizing a vehicle road speed signal source according to the present invention. The desired road speed is generated by a reference road speed signal source 11 as one input to a comparator and control signal generator 12. The reference road speed signal typically is a direct current voltage which is scaled to the desired road speed. A vehicle road speed signal source 13, according to the present invention, senses the rotational velocity of a rotating element associated with a prime mover 14 of the vehicle, such as a drive shaft to generate a triangular output signal having a frequency proprotional to the road speed of the vehicle. This signal is the other input to the comparator and control signal generator 12.

The comparator and control signal generator 12 compares the reference road speed signal with the vehicle road speed signal to obtain an error signal when they are not equal. The comparator and control signal generator 12 then generates a control signal to a control device 15 directing the control device to adjust the speed of the prime mover 14 so as to reduce the error signal to zero. The block diagram of FIG. 1, therefore, represents a closed loop control system for maintaining a uniform vehicle road speed.

Figure 3:
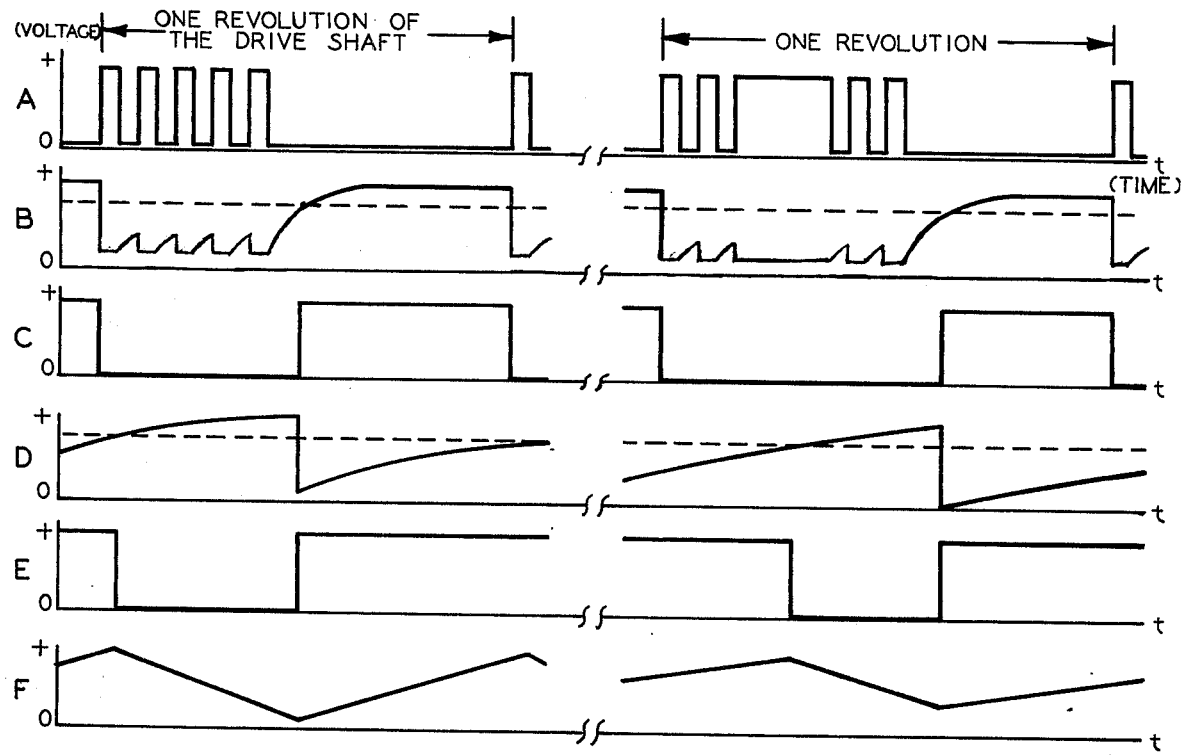
FIG. 3 is a waveform diagram of the various waveforms generated in the circuit of FIG. 2.
Figure 2:
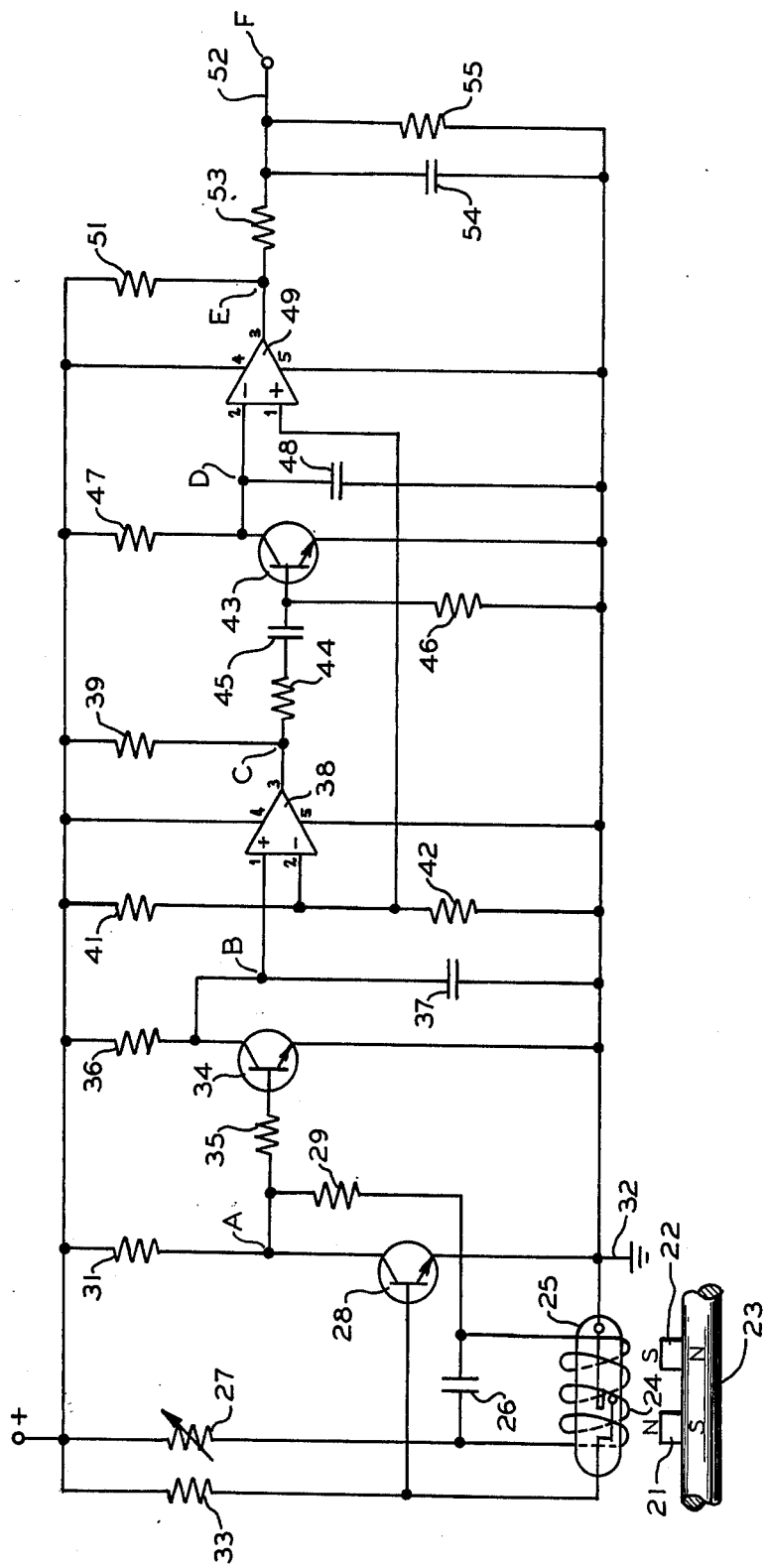
FIG. 2 is a partial front elevational view and a partial schematic diagram of the circuit of the present invention.

Referring to FIGS. 2 and 3, there is shown a schematic diagram of the circuit of the present invention and a waveform diagram of the waveforms generated in the circuit. A pair of permanent magnets 21 and 22 are attached to a rotating member of the vehicle which rotates at a speed proportional to the road speed of the vehicle. Typically, this member is a drive shaft 23 wherein the magnets are attached by any suitable means. A bias coil 24, wound around a normally open reed switch 25, is positioned proximate the rotational path of travel of the magnets 21 and 22. If the magnets 21 and 22 are magnetized as shown, with a north pole designated by the letter N and a south pole designated by the letter S, and positioned with the axis defined by the magnetic poles perpendicular to the longitudinal axis of the drive shaft 23, they will generate a magnetic field having lines of magnetic induction which leave the north pole of the magnet 21 and enter the south pole of the magnet 22. The magnetic field is completed from the north pole of the magnet 22 to the south pole of the magnet 21 through the drive shaft 23. As the drive shaft 23 rotates, the magnetic field will be rotated past the bias coil 24 and the reed switch 25. The magnets and the bias coil are oriented with respect to one another such that the magnetic fields aid each other. Two magnets are utilized to generate a larger magnetic field to ensure a more positive action of the reed switch 25 as will be discussed. However, one magnet may be utilized if it is oriented so as to generate lines of magnetic induction along the longitudinal axis of the drive shaft 12.

A capacitor 26 is connected in parallel with the bias coil 24 and one end of the coil is connected to a source of positive polarity direct current power (not shown) through a variable resistor 27. The other end of the bias coil 24 is connected to a collector of a NPN transistor 28 through a resistor 29. The collector of the transistor 28 is connected to the power soure through a resistor 31 and has an emitter connected to a circuit ground line 32. A base of the transistor 28 is connected to the power source through a resistor 33 and the reed switch 25 is connected between the base of the transistor 28 and the ground line 32.

The transistor 28 is provided with a biasing current at its base by the power source through the resistor 33. If the transistor 28 is biased so as to drive it into saturation and the resistance of the resistor 31 is relatively large as compared with the collector-emitter resistance, then the voltage at the collector of the transistor will be near the circuit ground potential. The resistor 27, the bias coil 24 and the resistor 29 are connected in series between the power source and the collector of the transistor 28 to function as a voltage divider to determine the voltage drop across the bias coil 24 and the current flowing through it. The bias coil 24 and the resistors 27 and 29 are chosen to provide a current to generate a magnetic field which is slightly less than the field required to close the reed switch 25. The current may be adjusted with the variable resistor 27. As the magnets 21 and 22 are rotated toward the bias coil 24, the magnetic field generated by the magnets will be added to the bias coil magnetic field. When the combined fields are strong enough, the reed switch 25 will close to connect the base of the transistor 28 to the ground line 32 and turn off the transistor. When the transistor 28 is turned off, the voltage at the collector will be at or near the power source potential as applied through the resistor 31.

During the time that the transistor was turned on, the capacitor 26 charged to the voltage drop across the bias coil 24. When the transistor 28 turned off, both terminals of the capacitor 26 were connected to the power source and the capacitor discharged. At the same time, current stopped flowing through the bias coil 24 and the biasing magnetic field collapsed. If the magnetic field generated by the magnets 21 and 22 is not strong enough to maintain the reed switch 25 contacts closed, the reed switch will open to disconnect the base of the transistor 28 from the ground line 32. Now the transistor 28 will be biased on with its collector near the circuit ground potential. The capacitor 26 will charge through the resistors 27 and 29 thereby allowing current to flow through the bias coil 24. As the current in the bias coil increases, so does the magnetic field. When the combined magnetic fields from the magnets 21 and 22 and the bias coil 24 are strong enough, the reed switch 25 will close and the base of the transistor 28 will again be grounded. Thus, the opening and closing of the reed switch will generate a pulse train at the collector of the transistor 28 shown as the waveform A of FIG. 3. The frequency of oscillation will be determined by the values of the capacitor 26 and the resistors 27 and 29 which define the charging time constant.

Each of the waveforms in FIG. 3 is shown for two positions of the magnets 21 and 22 with respect to the bias coil 24. In the first column of waveforms, the magnets are spaced relatively far from the bias coil to generate an uninterrupted pulse train as the reed switch oscillates. In the second column of waveforms, the magnets are positioned in close proximity to the bias coil. As the magnets approach and retreat from the bias coil, the reed switch will oscillate to generate the pulse train. However, during a center portion of the rotation past the bias coil, the magnetic field generated by the magnets in the vicinity of the reed switch is strong enough to hold the reed switch closed without the addition of the magnetic field generated by the biasing coil. Therefore, the reed switch 25 will not oscillate until the magnets have rotated far enough away to reduce the magnetic field below that which will hold the reed switch closed. This operation results in a longer length pulse generated between two or more pulses of the normal duration. The value of the variable resistor 27 may be adjusted to determine the frequency of oscillation of the reed switch 25 by changing the time constant for the charging of the capacitor 26.

The collector of the transistor 28 is connected to a base of a NPN transistor 34 through a current limiting resistor 35. The transistor 34 has a collector connected to the power source through a resistor 36 and an emitter connected to the ground line 32. When the transistor 28 is turned on, the base of the transistor 34 is at or near the circuit ground potential to turn off the transistor 34 and place its collector at or near the power source potential as shown in the waveform B of FIG. 3. When the transistor 28 is turned off, the base of the transistor 34 receives current thru the resistor 35 to turn on the transistor 34 and place its collector at or near the ground potential. A capacitor 37 is connected between the collector of the transistor 34 and the ground line 32. When the transistor 34 is turned off, the capacitor 37 charges to the power supply potential through the resistor 36. When the transistor 34 is turned on, the capacitor 37 quickly discharges through the relatively low collector-emitter resistance. As the reed switch 25 oscillates, the capacitor 37 will be alternately quickly discharged and slowly charged to generate the sawtooth waveform shown as a waveform B in FIG. 3. The relatively large value of the resistor 36 produces a large charging time constant such that there is insufficient time for the capacitor 37 to recharge to the power supply potential before it is discharged again. Thus, the waveform is generated at a relatively low value of voltage.

The collector of the transistor 34 is connected to a non-inverting input 38-1 of a high gain operational amplifier 38 which functions as a voltage comparator. The amplifier 38 is supplied with operating power from the power source which is connected to a terminal 36-4. The amplifier 38 responds to the difference in magnitude between the signals applied to the non-inverting input 38-1 and an inverting input 38-2 to generate an output signal proportional to that difference limited to a maximum near the potential connected to an output 38-3 and to a minimum near the potential connected to a terminal 38-5. Since the output 38-3 is connected to the power source through a resistor 39 and the terminal 38-5 is connected to the ground line 32, the output signal of the amplifier 38 will be limited between the power source potential and the circuit ground potential.

A resistor 41 is connected between the power source and the input 38-2 and a resistor 42 is connected between the input 38-2 and the ground line 32. The resistors 41 and 42 function as a voltage divider to apply some portion of the power source potential, typically sixty percent, to the input 38-2 as a reference voltage. The reference voltage is shown as a dashed line on the waveform B of FIG. 3. The magnitudes of the input signals are such that the amplifier 38 will generate its maximum potential when the signal applied to the input 38-1 is greater than the reference voltage and will generate its minimum potential when the signal applied to the input 38-1 is less than the reference voltage.

When the capacitor 37 discharges through the transistor 34, the signal at the input 38-1 will fall below the reference voltage and the amplifier 38 will switch from generating the maximum potential to generating the minimum potential. As the capacitor 37 fully recharges, the signal at the input 38-1 will exceed the reference voltage and the amplifier 38 will switch back to the maximum output potential. Therefore, the amplifier 38 output signal, as shown in the waveform C of FIG. 3, comprises a maximum potential signal interrupted by a circuit ground potential waveform during the time that the reed switch 25 is oscillating. The resistor 39 supplies current to a load connected to the amplifier output 38-3 since the amplifier output is connected to an open collector of an output transistor (not shown) internal to the amplifier.

The output signal from the amplifier 38 is applied to a base of a NPN transistor 43 through a series connected resistor 44 and a capacitor 45. A resistor 46 is connected between the base and the ground line 32. A resistor 47 is connected between a collector of the transistor 43 and the power source and an emitter of the transistor is connected to the ground line 32. The capacitor 45 differentiates the amplifier output signal and applies it to the base to switch the transistor 43. When the amplifier output signal is at the maximum potential, the capacitor 45 will charge through the resistors 44 and 46 to the power source potential to place the base of the transistor 43 at or near the circuit ground potential to turn off the transistor 43. When the amplifier output signal switches from the maximum potential to the minimum potential, the base of the transistor 43 will be driven to a negative potential since the voltage across a capacitor cannot change instantaneously. Therefore, the transistor 43 will remain in the switched off condition as the capacitor 45 discharges.

When the amplifier output signal switches from the minimum potential to the maximum potential, the current through the base of the transistor 43 will increase by the amount of the change in the amplifier output signal and then decrease to zero as the capacitor 45 charges. The increase in current through the base will turn on the transistor 43 which will remain turned on until the capacitor has charged sufficiently to reduce the base current below the turn on value. The values of the capacitor 45, the resistor 44, and to a lesser degree, the resistor 46 determine the discharge time constant and therefore, the maximum speed of the drive shaft for which the transistor 43 will be switched.

A capacitor 48 is connected between the collector of the transistor 43 and the ground line 32. When the transistor 43 is turned off, the capacitor 48 will charge to the power source potential through the resistor 47. When the transistor 43 is turned on, the capacitor 48 will discharge through the transistor 43. If the collector-emitter resistance of the transistor 43 is relatively low as compared with the value of the resistor 47, the voltage across the capacitor 48 will be a sawtooth waveform as shown in the waveform D of FIG. 3.

The differentiation by the capacitor 45 and the subsequent integration by the capacitor 48, change the output from the operational amplifier 38 from a constant duty cycle square wave to a sawtooth having a magnitude determined by the frequency of the square wave.

The collector of the transistor 43 is connected to an inverting input 49-2 of a high gain operational amplifier 49 which functions as a voltage comparator. The amplifier 49 is supplied with operating power from the power source which is connected to a terminal 49-4. The amplifier 49 responds to the difference in magnitude between the signals applied to the inverting input 49-2 and a noninverting input 49-1 to generate an output signal proportional to that difference limited to a maximum near the power source potential connected to an output 49-3 and to a minimum near the circuit ground potential at a terminal 49-5 connected to the ground line 32. The non-inverting input 49-1 is connected to the inverting input 38-2 of the amplifier 38 to receive the reference voltage which is shown as a dashed line on the waveform D of FIG. 3.

The magnitudes of the input signals are such that the amplifier 49 will generate its maximum potential when the signal applied to the input 49-2 is less than the reference voltage and will generate its minimum potential when the signal applied to the input 49-2 is greater than the reference voltage. When the capacitor 48 discharges through the transistor 43, the signal at the input 49-2 will fall below the reference voltage and the amplifier 49 will switch from generating the minimum potential to generating the maximum potential. As the capacitor 48 fully recharges, the signal at the input 48-2 will exceed the reference voltage and the amplifier will switch back to the minimum output potential. Therefore, the amplifier 49 output signal, as shown in the waveform E of FIG. 3, comprises a square wave having a frequency proportional to the speed of the drive shaft and therefore, the road speed of the vehicle. As resistor 51 is connected between the power source and the output 49-3 to supply current to a load since the amplifier output is connected to an open collector of an output transistor (not shown) internal to the amplifier. Since the magnitude of the sawtooth is inversely proportional to the drive shaft speed, the duty cycle of the comparator square wave output will be proportional to the speed.

The output 49-3 is connected to an output line 52 through a resistor 53. A capacitor 54 and a resistor 55 are connected in parallel between the output line 52 and the ground line 32. The capacitor 54 integrates the output signal from the amplifier 49 to generate a triangular output signal as shown in the waveform F of FIG. 3. The triangular output waveform has a frequency and a magnitude proportional to the road speed of the vehicle and may be utilized as the vehicle road speed signal input in a vehicle speed control system such as the system shown in FIG. 1.

In summary, the preferred embodiment of the present invention includes a reed switch oscillator which is responsive to a magnetic field for generating a high frequency pulse train. The transistor 28 is biased to an on state to supply current to the biasing coil 24. The biasing coil generates a magnetic field which has a magnitude slightly less than that required to close the reed switch 25. A permanent magnet means attached to a rotating member of the vehicle generates a magnetic field which aids the biasing coil magnetic field to close the reed switch contacts when the permanent magnet means is rotated into proximity with the reed switch. The reed switch grounds the base of the transistor which turns off. Now the current stops flowing in the biasing coil such that the magnetic field collapses and the reed switch contacts open. The transistor now is turned on and the cycle is repeated as long as the permanent magnet means are proximate the reed switch to generate a high frequency pulse train shown as the wvaveform A.

The pulse train switches on and off the transistor 34 to generate a collector voltage which is integrated by a capacitor 37. The integrated pulse train is a sawtooth waveform shown as the waveform B of FIG. 3 and is applied to a non-inverting input of a high gain operational amplifier 38. The amplifier 38 receives a reference voltage at an inverting input and functions as a voltage comparator to generate a square wave output, shown as the waveform C, which is the inverse of the collector voltage of the transistor 28. The amplifier output signal is differentiated by the capacitor 45 and applied to the base of a transistor 43.

The transistor 43 is turned on by a transition between the minimum potential and the maximum potential of the amplifier output signal to discharge the capacitor 48. The capacitor 48 then charges to generate a sawtooth waveform, shown as the waveform D, at an inverting input to the amplifier 49. The amplifier 49 receives the reference voltage at a non-inverting input and functions as a voltage comparator to generate a square wave output signal shown as the waveform E. The square wave output signal is integrated by the capacitor 54 to generate a triangular waveform having a frequency and a magnitude proportional to the speed of the rotating vehicle member. Since each rotation of the permanent magnet means generates one triangular wave, the present invention is extremely accurate at low vehicle speeds and may be utilized as an odometer signal source.

In accordance with the provisions of the patent statutes, the principle and mode of operation of the invention have been explained and illustrated in a preferred embodiment. However, it must be understood that within the spirit and scope of the appended claims, the invention may be practiced otherwise than as specifically illustrated and described. Although the present invention has been illustrated in the preferred embodiment as a vehicle road speed signal source, it can be utilized to detect relative movement between two objects in numerous applications. For example, the magnet means can be attached to a member of an engine rotating at a speed proportional to the engine speed wherein the present invention functions as an analog tachometer. In another application, the magnetic means and the oscillator can be positioned such that the magnetic field is decreased in strength by objects moving on a conveyor wherein the present invention functions as a parts counter. Other applications for the present invention will be apparent to those skilled in the art.

What is claimed is:

1. An apparatus for generating an output signal representing the road speed of a vehicle, comprising:
    magnetic means attached to a member of the vehicle rotating at a speed proprotional to the road speed of the vehicle for generating a first magnetic field;
    oscillator means responsive to the absence of said first magnetic field for generating a first signal and responsive to the presence of said first magnetic field for generating a pulsed second signal, said oscillator means including a biasing coil, switch means for selectively applying current to said biasing coil to generate a second magnetic field and means responsive to said first and second magnetic fields for turning off said switch means to remove said current from biasing coil; and
    means responsive to said first and second signals for generating said output signal.

2. An apparatus according to claim 1 wherein said vehicle member is a drive shaft.

3. An apparatus according to claim 1 wherein said magnetic means is a pair of spaced apart permanent magnets positioned so as to generate said first magnetic field between them.

4. An apparatus according to claim 1 wherein said means for turning off said switch means is a reed switch responsive to the combined first and second magnetic fields for turning off said switch means and responsive to the absence of either or both of the first and second magnetic fields to turn on said switch means.

5. An apparatus according to claim 1 wherein said oscillator generates said first signal at a constant first predetermined magnitude and generates said second signal as a pulse train which alternates in magnitude between said first predetermined magnitude and a second predetermined magnitude.

6. An apparatus according to claim 5 wherein said first and second signal responsive means includes a first integrator means responsive to said first and second signals for generating a first integrated signal, a source of a reference signal, a first comparator responsive to said first integrated signal and said reference signal for generating a first square wave signal and means responsive to said first square wave signal for generating said output signal.

7. An apparatus according to claim 6 wherein said first square wave signal responsive means includes differentiator means responsive to said first square wave signal for generating a differentiated signal, a second integrator means responsive to said differentiated signal for generating a second integrated signal, a second comparator responsive to said second integrated signal and said reference signal for generating a second square wave signal and means responsive to said second square wave signal for generating said output signal having a frequency and magnitude proportional to the vehicle road speed.

8. An apparatus according to claim 7 wherein said second square wave signal responsive means is a third integrator means responsive to said second square wave signal for generating a triangular waveform as said output signal.

9. An apparatus for detecting relative movement between two objects, comprising:
   magnetic means attached to the first object for generating a first magnetic field;
   oscillator means attached to the second object proximate said magnetic means and responsive to relative movement between the two objects in a direction to decrease the strength of said first magnetic field proximate said oscillator means for generating a pulsed signal, said oscillator means including a biasing coil, switch means for selectively applying current to said biasing coil to generate a second magnetic field and means responsive to said first and second magnetic fields for turning on and off said switch means to selectively apply said current to said biasing coil to generate said pulsed signal; and
   means responsive to said pulsed signal for generating an output signal indicating the detection of the relative movement.

* * * * *

UNITED STATES PATENT OFFICE
CERTIFICATE OF CORRECTION

Patent No. 4,025,819            Dated May 24, 1977

Inventor(s) Edward E. Lafever and Larry O. Gray

It is certified that error appears in the above-identified patent and that said Letters Patent are hereby corrected as shown below:

| | |
|---|---|
| Column 3, line 40 | Change "soure" to - - source - - . |
| Column 7, line 4 | Change "as" to - - A - - . |
| Column 7, line 42 | Change "wvaveform" to - - waveform - - . |

Signed and Sealed this

Seventeenth Day of January 1978

[SEAL]

Attest:

RUTH C. MASON  
Attesting Officer

LUTRELLE F. PARKER  
Acting Commissioner of Patents and Trademark